United States Patent
Hockmeyer et al.

[11] Patent Number: 5,855,089
[45] Date of Patent: Jan. 5, 1999

[54] PLIABLE FISHING LURE AND PLANAR WEEDLESS FISH HOOK

[76] Inventors: Wayne F. Hockmeyer, P.O. Box 100, The Forks, Me. 04985; Kenneth Daubert, 1491 SE. 189th St., Silver Spring, Fla. 34488

[21] Appl. No.: 810,145

[22] Filed: Feb. 25, 1997

Related U.S. Application Data

[63] Continuation-in-part of Ser. No. 409,022, Mar. 23, 1995, abandoned.

[51] Int. Cl.⁶ .................................................. A01K 85/00
[52] U.S. Cl. .................... 43/42.37; 43/43.6; 43/42.33; 43/42.43; 43/42.48
[58] Field of Search .................. 43/43.6, 42.32, 43/42.33, 42.37, 42.38, 44.8, 42.43, 42.25, 42.45, 42.48, 42.28

[56] References Cited

U.S. PATENT DOCUMENTS

| | | | |
|---|---|---|---|
| 1,593,604 | 7/1926 | Schreiner | 43/42.48 |
| 1,786,568 | 12/1930 | Kutz | 43/42.48 |
| 1,921,176 | 8/1933 | Unkefer | 43/42.48 |
| 1,926,459 | 9/1933 | Sico | 43/42.48 |
| 1,990,693 | 2/1935 | Hildebranddt | 43/42.37 |
| 2,254,949 | 9/1941 | Messacar | 43/42.28 |
| 2,277,790 | 3/1942 | Sisco | 43/42.37 |
| 2,298,811 | 10/1942 | Sisco | 43/42.38 |
| 2,619,763 | 12/1952 | Siebert | 43/42.43 |
| 3,218,750 | 11/1965 | Lewin | 43/42.28 |
| 3,864,863 | 2/1975 | Neal | 43/42.25 |
| 4,317,305 | 3/1982 | Firmin | 43/42.24 |
| 4,334,381 | 6/1982 | Carver | 43/44.8 |
| 4,794,720 | 1/1989 | Robertaccio | 43/43.6 |
| 4,841,665 | 6/1989 | McGahee | 43/43.25 |
| 4,956,934 | 9/1990 | Dahl | 43/42.33 |
| 5,117,575 | 6/1992 | Desmond | 43/44.8 |
| 5,230,178 | 7/1993 | Dillard | 43/44.8 |
| 5,678,350 | 10/1997 | Moore | 43/42.37 |

FOREIGN PATENT DOCUMENTS

| | | | |
|---|---|---|---|
| 25 33 492 | 2/1977 | United Kingdom | 43/42.33 |

*Primary Examiner*—Kurt Rowan
*Attorney, Agent, or Firm*—Tyrone Davis; John S. Kendall; Davis & Kendall, PC

[57] ABSTRACT

The pliable bait minnow (1) having a head (4), body (6), and a tail (3). Twin lower fins (2) attached to the belly of the pliable bait minnow (1) and an upper dorcel fin (11) attached along the upper back. The body (6) is translucent with light reflective particles (5) dispersed throughout the pliable bait minnow (1). The fish is life-like in that it incorporates a two tone effect. The lower portion of the body (6) having a lighter coloration (7). The middle portion of the body (6) having a textured surface area resembling scales (8). The mouth (9) includes a wire coil (41) which attaches the pliable bait minnow (1) to the hook (10).

11 Claims, 5 Drawing Sheets

PLIABLE FISHING LURE AND PLANAR WEEDLESS FISH HOOK

FIELD OF INVENTION

The invention relates to fish hooks and lures, in particular such fish hooks that incorporate protection from inadvertent contact with weeds, grass, or rocks. In addition, this invention presents a fish lure which invokes a genetic response by fish to strike, which significantly improves the fishermen's catch results. This invention is a continuation-in-part of Ser. No. 08/409,022, filed on Mar. 23, 1995, wherein a disclosure document describing that invention was filed on Jan. 23, 1995 and assigned document number 368,732.

BACKGROUND OF INVENTION

For many years recreational fishermen have used fish hooks with bait as the primary means of catching fish from oceans, lakes, rivers, and streams. While there are many varieties of fish hooks, there are a few common features. Fish hooks will always have some means of attachment to a line (usually the eye of the hook on a shank) and will have an opposite end which "hooks" around substantially in a semi-circle. The free end of the hooked semi-circle will typically be sharply pointed, and the point will be adapted with a barb. The point and barb permits the flesh of a fish to pass easily over the hook but then become snagged on the barb so that the fish will be trapped on the hook.

Fish lures or bait have always been considered as a critical element in the art of fishing. Fishing lures have been introduced in many sizes and shapes. Worms, frogs, shrimp, small fish, and an assortment of various insects are the most popular forms of bait. The bait or lure has been modified to become more life-like and perform more natural movements in the water by adding spinners, lips and flaps. The result has been that the lure has produced a mechanical or repetitive swimming action as it is pulled through the water. The problem associated with this approach is that live organisms have a random action or motion. In addition, having a life-like bait would not induce the fish to bite if it were not hungry.

Research has proven that biting fish actually cause an action similar to inhaling. In most instances fish bite the front or the head of the fish. The fish approaches the unsuspecting fish flaring its gills sucking in water, fish, and line. Most lures or bait are designed to be reeled through the water thereby, requiring a taunt line. Therefore, when the fish attempts to create the inhaling action and sucks the lure or bait into its mouth. The taunt line pulls it out. Necessitating conventional lures to incorporate additional hooks on the body of the lure. Placement of these hooks are either at the rear or belly area of the lure. More particularly these lures or bait have a specific gravity which is either more or less than that of water causing the bait to have a tendency to float on top of the water or sink to the bottom. Thus, requiring that the line be weighted or the addition of floaters.

In an attempt to create a more natural swim effect, the fishermen must reel the weighted lure through the water. The fishing lures have been designed with appendages swivels flaps, and spinning blades in order to create a movement that appears life-like. All of the above inhibit the natural, motion, and effect and does not create natural movement. As a result of these attempts to create a more natural movement in the water, fishing lures have had to take on a more cartoonish appearance. Because of this appearance fish often ignore the conventional lures and move on.

Fish hooks are also adapted for the use of bait. The bait must be secured to the hook during the casting of the line and hook and remain on upon impact with the water. The bait should also be positioned in such a manner as to remain near enough to the hook point and barb so that a fish biting the bait will also take the hook point and barb.

One popular feature of fish hooks is the incorporation of an apparatus to protect the may be within waters to be fished. A popular form of such weed protection comprises an elongated "U" shaped formation of wire. Such extends from a point near the eye of the hook with the "U" end adapted to cover the point of hook and hold its place until pushed off the hook point when depressed. The resistance of the spring wire weed guard should be minimal so that a fish attempting to "take the bait" will encounter no resistance when its mouth attempts to close over the hook. This particular form of weedless hook tends to work properly only if it retains its original shape. In addition, it requires an apparatus which substantially complicates the manufacture and increase the cost of the hook.

The weed guard must be precisely and carefully positioned on both the shank and the hook so that it fits properly. The material for the guard apparatus must also be durable and non-corrosive because the hook and its weed guard will only be of value as long as all parts of the hook are operating.

A recent example of one of these more elaborate weed guards is U.S. Pat. No. 5,274,946, issued to Fusco apparatus incorporates a carefully positioned and rigidly attached weed guard base near the eye of the hook, together with a hook-positioning apparatus (which in the case of Fusco includes a separate spring wire attachment). It can be seen that the area between the point of the hook and the eye of the hook is protected by the weed guard apparatus so that loose impediments passing by the hook or through which the hook is passing will be discouraged from making contact with the point or barb of the hook.

A more simple invention is taught in U.S. Pat. No. 3,605,318, issued to Santo, et al on Sep. 20, 1971. In the Santo hook a weed-guarding band can be placed within the barb of a hook, passed through the closed eye of the hook, and then connected to another barb along the shank of the hook. Accordingly, Santo appears very much like other fish hooks except that additional barbs must be placed along the shank of the hook. Such barbs do overly complicate the manufacture of the fish hook. In addition, Santo et al. has to double loop the band through the eye of the hook. Thus, making it a difficult task to pass a line through the eye of the hook. Requiring either an enormous eye on the hook or the use of a tool.

Additionally, the extra barb itself to some extent defeats the purpose of affording the weedless protection since it offers the opportunity for a snag. More importantly, the prior art hook and weed-guard arrangements have been prone to dislodging or slippage, because the shape of the hook and point of the barb create an opportunity for the weedguard to be hit by underwater objects. The placement of the weedguard at the front of the hook is in direct line with the direction the bait is being pulled. Another aspect is that every time the weedguard is disengaged while fishing you loose the weedguard, which adds significant costs to the fisherman. Finally, the act of passing the band through the small eye of the hook is a very difficult maneuver, requiring tools and significant manual dexterity. It is another of the minute tasks which prolong the period required to get ready at the expense of fishing time.

What is needed but not provided in the prior art is a fish hook with a removable banded weed guard protection which is simple to manufacture, safe, and yet effective. A banded weed guard that is retained when a fish is caught and has a normal sized eye. Additionally, what is needed is a bait or fish lure having a life-like appearance, random body movements and random directional action. A fish lure that has the ability to induce fish to bite even though they are not hungry. Finally, it would be to the advantage to the fisherman to have a bait to hook arrangement which increases the bite to hook ratio.

SUMMARY OF THE INVENTION

The inventors have overcome the problems remaining from the prior art by devising a fish hook which permits the use of a removable banded weed guard apparatus (which may be stored and transported completely separately from the rest of the hook) and is simple to manufacture. The inventors have created a bait having the appearance of a small minnow that is life-like and having natural movements in the water. The lure having a random directional action and body movement, and perfectly mimics the spastic action of a crippled dying fish. This emulation of a dying fish triggers a genetic response by the fish inducing it to bite even if not hungry.

The improved hook does not result in the use of additional barbs or potential cutting or snagging surfaces on the hook, doesn't come off, is easily removed requiring no tools, and the weedguard is not in forward fishing position that will allow an accidental disengagement by striking objects. The advantages of the present invention are essentially achieved by placing the eye in the same plane as the rest of the hook and leaving it slightly opened. The shape of the hook also is an important factor in the bite-to-hook ratio. The shape of the hook has been formed in such a way as to include a bowl or belly area at the base of the shank, having a substantially semi-oval or semi-oblong shape. The coplanar arrangement of the bait to the line and the barb of the hook provides the advantage in the hook ratio.

It is then an object of the invention to provide a fish lure or bait which is life-like appearance.

It is an object of the invention to provide a fish lure or bait having random directional action and body movements in water.

It is an object of the invention to provide a fish lure or bait having random body movements in water.

It is a further object of the invention to provide a fish lure which creates the appearance of a crippled, dying fish and triggers a genetic response causing a fish to bite.

It is a further object of the present invention to provide such a fish hook with weed guard protection coming from the use of a band.

It is a further object of the present invention to provide such an apparatus with an arrangement where the line pull and hook point are in line which increases the hook strike ratio.

It is a further object of the present invention to provide such a hook structure and hook point-to-line arrangement which is in a single plane.

Other features and advantages of the present invention will be apparent from the following description in which the preferred embodiments have been set forth in conjunction with the accompanying drawings

BRIEF DESCRIPTION OF THE DRAWINGS

In describing the preferred embodiments of the invention reference will be made to the series of figures and drawings briefly described below.

There may be additional structures described in the foregoing application which are not depicted on one of the described drawings. In the event such a structure is described but not depicted in a drawing, the absence of such a drawing should not be considered as an omission of such design from the specification.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
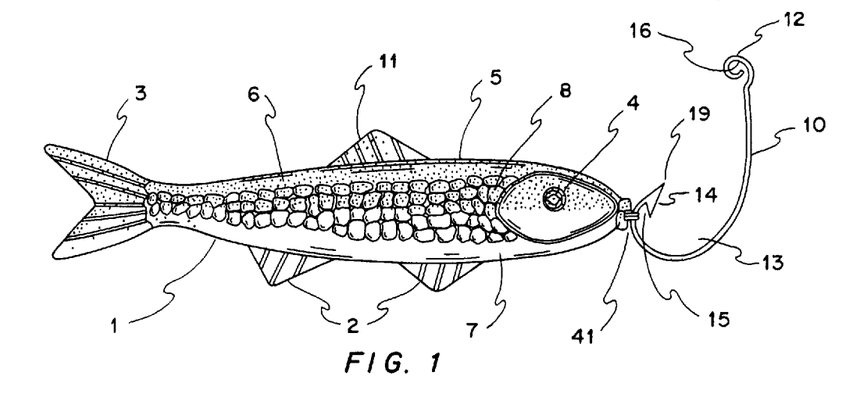
FIG. 1 shows a side view of the pliable bait minnow attached to the fish hook.
Figure 2:
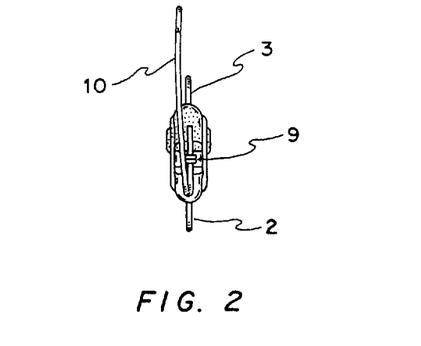
FIG. 2 shows the front view of the pliable bait minnow and hook.
Figure 3:
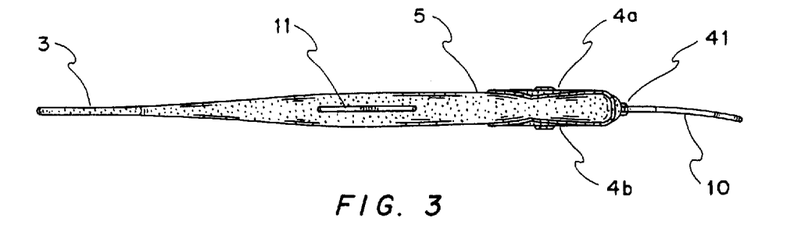
FIG. 3 shows the top view of the pliable bait minnow.

The invention comprises a new and unique pliable bait minnow fishing lure. A fish hook and elastic band combination with which weed protection is afforded. In addition, it provides for a unique bait-to-hook-to-line arrangement. This arrangement affords a greater bite to hook ratio. As shown in FIGS. 1–3, a pliable bait minnow (1) is attached to fish hook (10). The fish hook (10) is substantially housed within a single plane (11), that is to say that the hook eye (12) is in the same plane as the bend (13) in the hook (10). The fish hook (10) further comprises at least one barbed bulk (14) near the hook point (19) with at least one generally straight line side (15) which can receive an elastic band, and a band holding surface (16) in the vicinity of the hook eye (12).

Making reference to the pliable bait minnow (1), the bait is made from the group consisting of rubber, plastic, or resin. The pliable bait minnow (1) is designed to be very thin without any hooks or weights attached thus, having the ability to create a wave-like ripple action that travels down the body (6) creating an illusion of swimming. The pliable bait minnow (1) having a head (4), body (6), and a tail (3). Twin lower fins (2) attached to the belly of the pliable bait minnow (1) and an upper dorcel fin (11) attached along the upper back. The body (6) is translucent with light reflective particles (5) dispersed throughout the pliable bait minnow (1). The fish is life-like in that it incorporates a two tone effect. The lower portion of the body (6) having a lighter coloration (7). The middle portion of the body (6) having a textured surface area resembling scales (8). The mouth (9) includes a wire coil (41) which attaches the pliable bait minnow (1) to the hook (10).

Predator fish are genetically programmed to eat crippled, wounded, or dying fish. The pliable bait minnow invokes a genetic response bite from the fish by having the ability to mimic the spastic action of a crippled dying minnow. The pliable bait minnow has a specific gravity equal to or slightly greater than that of water. Giving the pliable bait minnow a neutral buoyancy. This allows the pliable bait (1) to maintain a more constant position within the depths of the water. The neutral buoyancy gives the pliable bait minnow an illusion of the spastic action of a dying minnow. This induces the fish's genetic response causing the fish to bite even though it may not be hungry. Because the bait is at rest and there is slack line, when the fish bites there is no resistance. The fish's inhaling action allows the fish to inhale both the entire pliable bait minnow (1), and the hook (10). The inhaling action is so complete that upon jerking on the line the fisherman is assured of piercing the flesh of the fish with the hook (10).

The pliable bait minnow (1) has a thin tapered body (6) that ranges from 7.6 to 11.4 centimeters in length, and from 0.2 centimeters in width from the tail (3) to 0.7 centimeters in width at the head (4). Another larger embodiment ranges from 13.9 centimeters in length, and tapers from 0.2 centimeters in width at the tail to 0.9 centimeters at the head. (Not shown) The thin tapered pliable body (6) having no hooks or weights attached causes the bait (1) to have the natural spastic action of a crippled fish when jerked in the water. All of the embodiments include indentations along the side of the head (4), which give the appearance of eye sockets (4a and 4b).

Figure 4:
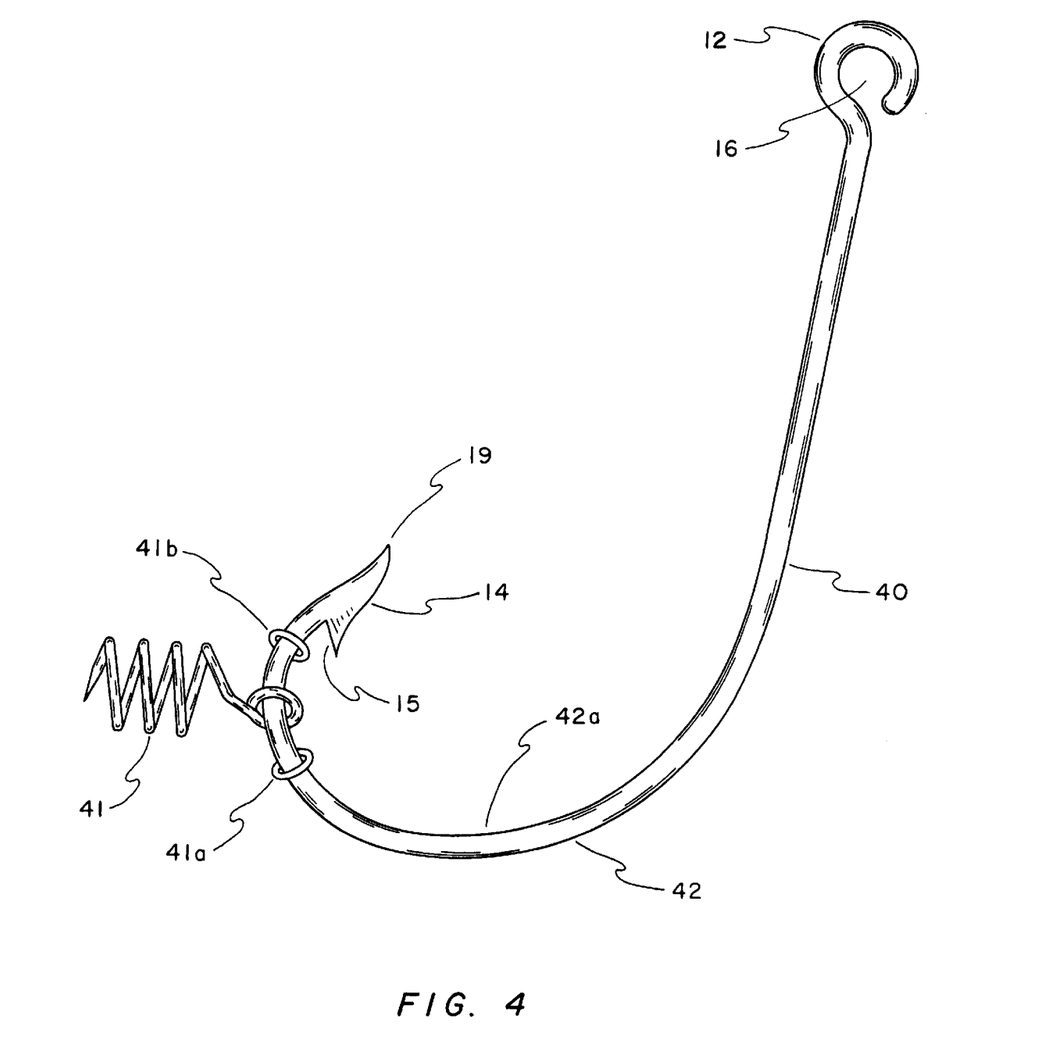
FIG. 4 shows another embodiment of the nose hook arrangement having a modified neck and the eye opening outward.
Figure 6:
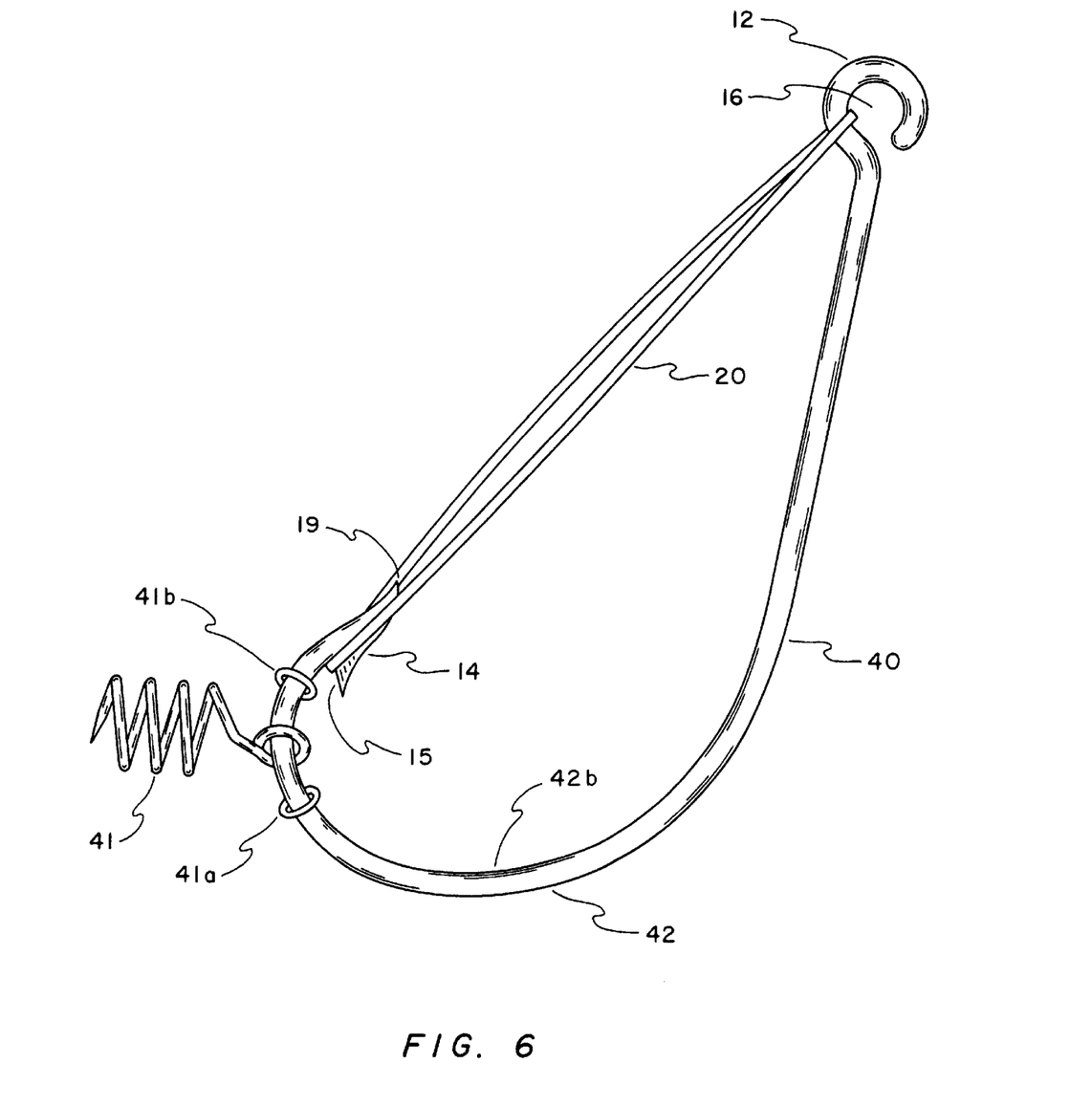
FIG. 6 shows the embodiment of the nose hook arrangement as shown in FIG. 4 with the weedguard.

Making reference to FIGS. 4 it can also be seen that an open-eye (12) configuration offers an accessory option advantage. The open eye (12) hook (40) in FIG. 3 allows a closed eye wire coil (41) in essentially a cork screw configuration to be attached to the hook (40). This wire coil (41) may be screwed into plastic, rubber lures or pork rind so that the bait does not fly off when cast. More importantly, the wire coil (41) allows the bait to be attached to the hook leaving the hook completely exposed. The wire coil (41) or cork screw in tandem with a restriction means, an o-ring (41a) allows the fishermen the ability to position the bait so as to achieve maximum flexibility, and buoyancy, freeing the bait to come alive. This placement and arrangement with the bait causes the pull and hook point (19) to be in line for a better contact with the flesh of the fish. In addition, a substantially bowl or belly shaped portion (42) has been formed in the shank of the hook (40), creating a base area in the hook (40) by having a substantially semi-oval 42a or semi-oblong 426 shape. This allows the fisherman to position the wire coil (41) so that the bait lays in a natural state and yet keeps the line-to-bait-to pull arrangement. The wire coil (41) is attached to the hook (40) and is screwed into the nose of the pliable bait. The wire coil (41) is placed near the straight line side of the barb (15), and o-ring (41b) slides behind the wire coil (41) creating an arrangement which restricts the movement of the wire coil and prevents it from slipping off over the barb. In addition, it creates an arrangement which allows free and natural movement of the bait and the placement of the wire coil (41) and leaves little opportunity for a biting fish to miss having the flesh of its mouth pierced by the hook point (19). The free and natural movement allows the fisherman to create random movement of the bait A variation of this arrangement contemplates having two o-rings (41a and 41b). The o-rings (41a and 41b) may be replaced by a crimped piece or some other item which has the ability to restrict the movement of the wire coil (41). While FIG. 6 shows the arrangement in conjunction with a weed guard (20), the arrangement is designed to be used for weedless and non-weedless open and closed eye fish hooks.

The eyes (12, FIGS. 1–4) allows the rubber band to use the eye hook as an attachment point and keeps the band (20) properly oriented to fit along the sides of and conceal the hook point (19) and barb (14). When the rubber band is stretched between the two surfaces (15 and either 12, FIG. 4), it protects the hook point from snagging weeds, wood, rocks, or other undesired objects since the hook point is hidden between or just below the rubber bands.

The coplanar eye (12, FIG. 4) of the hook also allows the hook to slip through weeds, wood, grass or vegetation (not depicted) more easily then a hook eye that is in a horizontal plane to the rest of the hook (not depicted). This is because less profile is offered by an apparatus which is defined in a single plane.

The band (20) must be elastic and should be made of a material which does not degrade in water. It should be selected of a length to require some stretching to reach between securing points (15 and 12 FIG. 4) but not so severely so as to stress the hook structure or offer substantial resistance to a fish biting the hook (19). The band (20) should also be of sufficient width (24) to cover the point (19).

Figure 5:
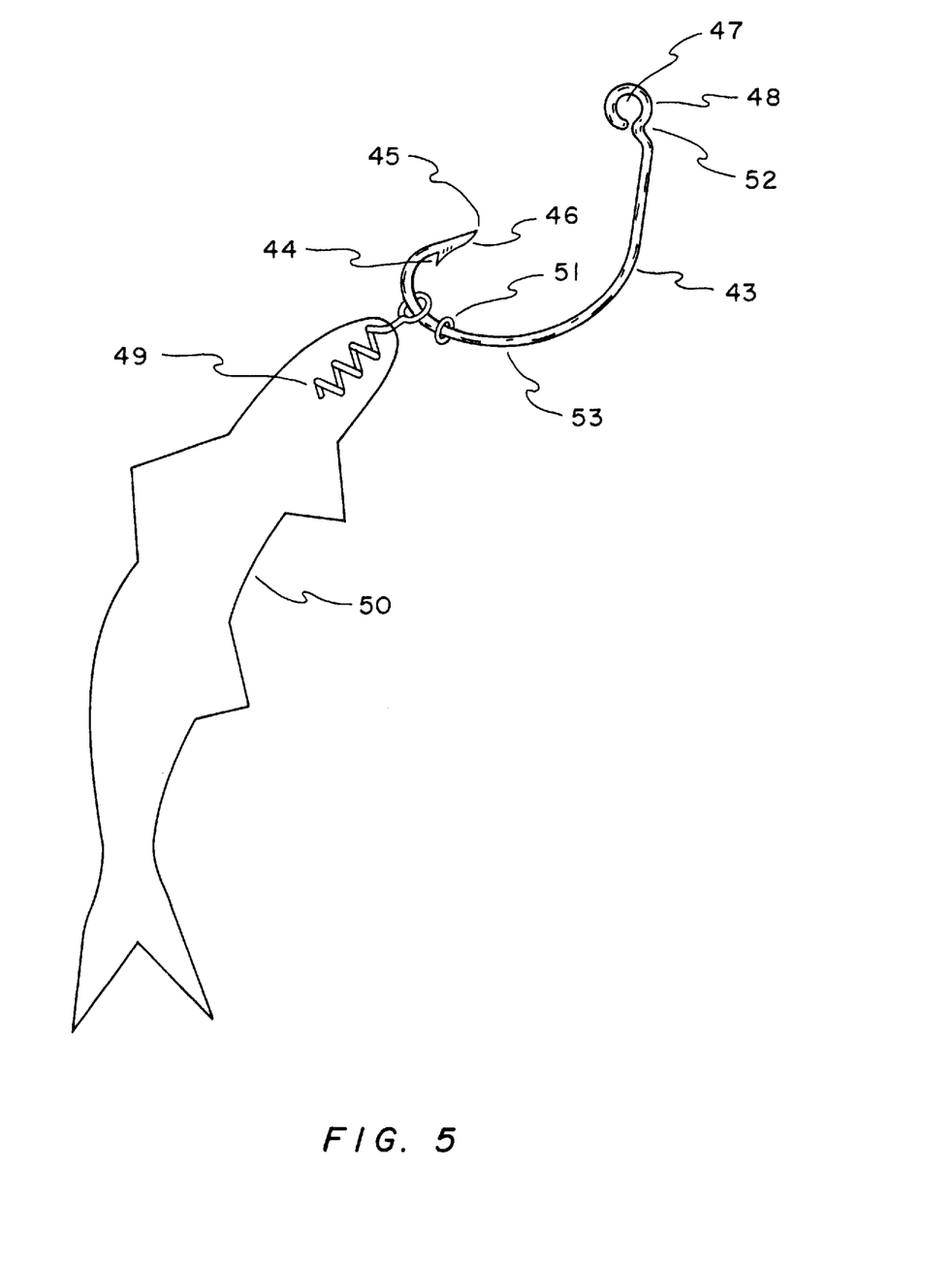
FIG. 5 shows the nose hook arrangement with a pliable bait with the modified neck and the eye opening inward.

Referring to FIG. 5 the hook (43) includes a open and inward turned eye (47) having an area (48) to receive the line. A hook point (45) and a hook point barb (46). The hook point barb (46) being adapted to include a smooth linear surface (44). A wire coil (49) is screwed into the nose of the bait (50) with a restriction means (51) which keeps the bait in line with, or close to the hook point (45). This embodiment further incorporates a bent shank (52) which provides a better alignment of the point barb (45) to line pull. A substantially belly or bowl shaped portion (53) is shown which allows a large bite area and provides greater freedom to the fisherman for the placement of the bait (50). Additionally, the hook point (45) is curved toward the belly or bowled shaped portion (53) of the hook (43). Thus, ensuring the desired bite-to-hook ratio, because the hook point is closer to the bait and keeps the weedguard from facing forward.

FIG. 6 shows the embodiment of the invention as shown in FIG. 4, including the belly portion of the hook (42) and the placement of the band (20) on the hook (40) which covers the hook point (19) of the barb (14).

Figure 7:
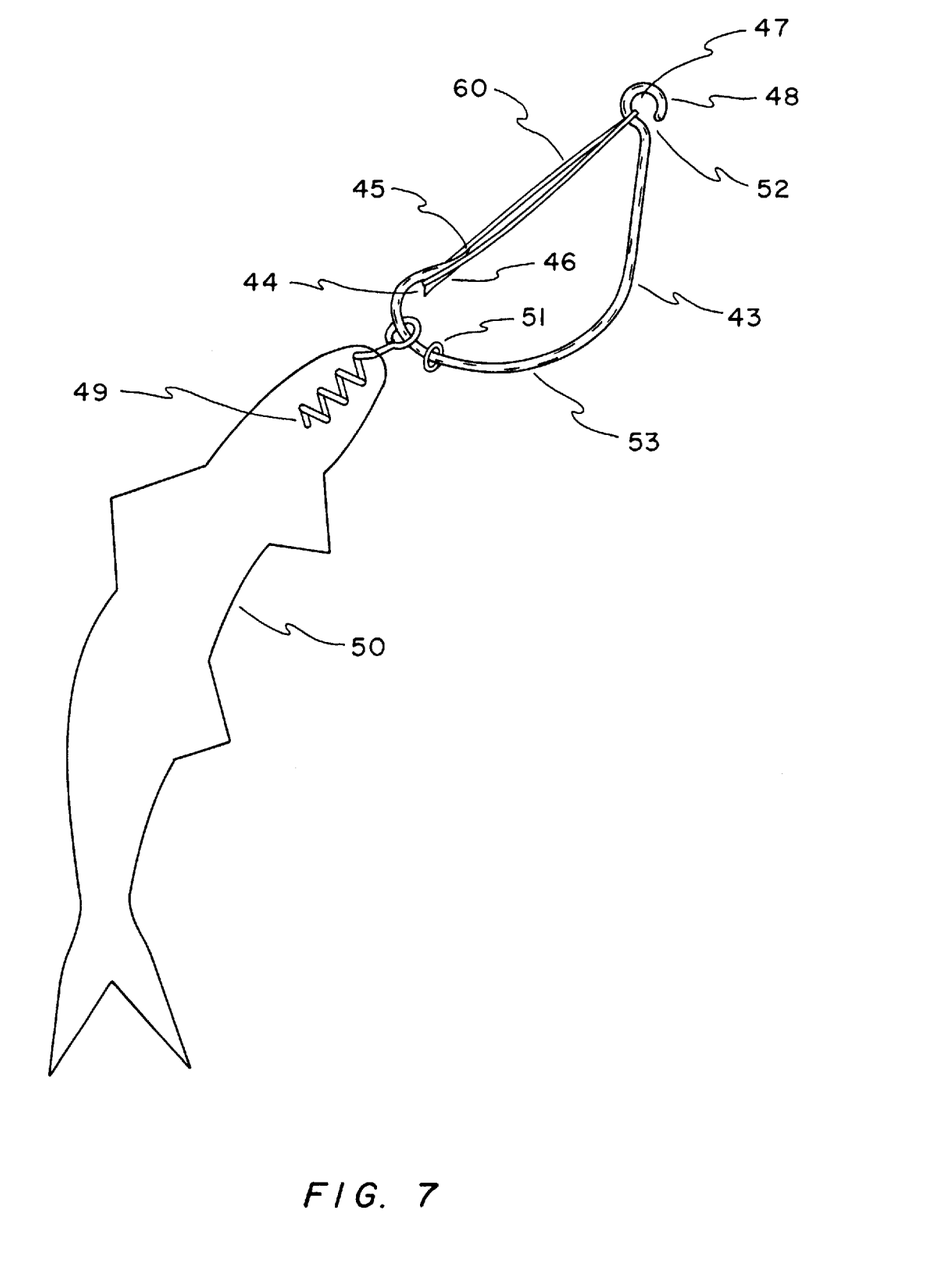
FIG. 7 shows the embodiment of the nose hook arrangement as shown in FIG. 5 with the weedguard.

FIG. 7 shows the embodiment of the invention as shown in FIG. 5, including the belly portion of the hook (43) and the placement of the band (0) on the hook (43) which covers the hook point (45) of the barb (46).

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. A fish lure having a unit of integral fish form having a natural spastic action of a crippled fish when jerked through the water by a hook and line, consisting of:

a translucent textured body portion including a tail attached at one end of said body portion and a head attached at the other end of said body portion;

said head adapted to include a mouth portion;

fins attached to said textured body portion;

said integral fish form having a specific gravity equal to that of water and giving said integral fish form a neutral buoyancy;

light reflective particles dispersed within said textured body portion; and said textured body portion having a pliable thin tapered shape, and adapted so that when jerked through the water a wave-like ripple movement travels down said body; and means for attaching said fish lure to said hook screwed into said mouth.

2. The fish lure as recited in claim 1, wherein said integral fish form is made from the group consisting of rubber, plastic, or resin.

3. The fish lure as recited in claim 2, wherein said hook comprises:

a hook shank;

a fish hook point, including a hook point barb attached to said shank and said hook point barb is adapted with a linear receiving surface to receive a loop of elastic band;

an eye attached to one end of said shank and on an opposite end to said hook point, said eye is adapted with a receiving surface to receive a loop of an elastic band;

means for restricting the movement of said bait along said hook shank while keeping the bait in close proximity with said linear surface of said hook point;

said elastic band being of such a length and elasticity to stretch and seat between said eye and said hook point barb receiving surfaces, and said band is of sufficient width to conceal said hook point;

said eye and said hook point barb receiving surfaces further positioned so that said elastic band, when stretched between said eye and said hook point receiving surfaces, will pass beside and cover said hook point; and wherein said hook point, said eye, and said hook point barb receiving surfaces are substantially coplanar.

4. The fish lure as recited in claim 3, wherein said shank is adapted to form a substantially bowl shaped base.

5. A lure to fish hook arrangement, such arrangement comprising:

a substantially coplanar fish hook, said fish hook including a shank, said shank having a base and said base being substantially bowl shaped, a hook point including, a hook point barb attached to said shank; an eye attached to one end of said shank and on an opposite end to said hook point;

a fish lure attached to said hook and in closer proximity to said hook point barb consisting of a translucent textured body portion including a tail attached at one end of said textured body portion and a head attached at the other end of said textured body portion, said fish lure having a specific gravity equal to that of water and giving said integral fish form a neutral buoyancy, said head adapted to include a mouth portion, fins attached to said textured body portion, light reflective particles dispersed within said textured body portion, said textured body portion having a pliable thin tapered shape, and adapted so that when jerked through the water a wave-like ripple movement travels down said textured body portion;

said hook point barb having a linear surface;

said hook having means for attaching said fish lure to said hook and means for attaching including a coil screwed into the mouth portion of said fish lure allowing free and natural movement of said fish lure; and said hook having means for restricting the movement of said fish lure along said fish shank while keeping said fish lure in close proximity with said linear surface of said hook point barb.

6. The fish lure to fish hook arrangement as recited in claim 5, whereby said means for restricting movement of said bait includes an o-ring attached to said hook shank positioned between said means for attaching said fish lure to said hook and said eye of said hook.

7. The fish lure to fish hook arrangement as recited in claim 6, whereby said means for restricting movement of said bait includes an o-ring attached to said hook shank positioned between said means for attaching said fish lure to said hook and said hook point barb.

8. The fish lure to fish hook arrangement as recited in claim 7, whereby said means for restricting movement of said fish lure includes a first o-ring attached to said hook shank positioned between said means for attaching said bait to said hook and said eye of said hook and a second o-ring attached to said hook shank and positioned in close proximity of said linear surface of said hook point barb.

9. The fish lure as recited in claim 8, wherein said integral fish form is made from the group consisting of rubber, plastic, or resin.

10. The bait to fish hook arrangement as recited in claim 9, whereby said base is defined as a substantially semi-oval shape.

11. The bait to fish hook arrangement as recited in claim 9, whereby said base is defined as a substantially semi-oblong shape.

* * * * *

/

(12) REEXAMINATION CERTIFICATE (4286th)
United States Patent
Hockmeyer et al.

(10) Number: US 5,855,089 C1
(45) Certificate Issued: Mar. 6, 2001

(54) PLIABLE FISHING LURE AND PLANAR WEEDLESS FISH HOOK

(75) Inventors: Wayne F. Hockmeyer, P.O. Box 100, The Forks, ME (US) 04985; Kenneth Daubert, 1491 SE. 189th St., Silver Spring, FL (US) 34488

(73) Assignees: Wayne F. Hockmeyer, The Forks, ME (US); Kenneth Daubert, Silver Spring, FL (US)

Reexamination Request:
No. 90/005,645, Feb. 25, 2000

Reexamination Certificate for:
Patent No.: 5,855,089
Issued: Jan. 5, 1999
Appl. No.: 08/810,145
Filed: Feb. 25, 1997

Related U.S. Application Data (63) Continuation-in-part of application No. 08/409,022, filed on Mar. 23, 1995, now abandoned.

(51) Int. Cl.⁷ ................................. A01K 85/00
(52) U.S. Cl. .............. 43/42.37; 43/43.6; 43/42.33; 43/42.43; 43/42.48
(58) Field of Search ................. 43/43.6, 42.32, 43/42.33, 42.37, 42.38, 44.8, 42.43, 42.25, 42.45, 42.48, 42.28

(56) References Cited

U.S. PATENT DOCUMENTS

| | | |
|---|---|---|
| 1,990,693 | 2/1935 | Hildebrandt . |
| 2,619,763 | 12/1952 | Siebert . |
| 4,998,372 | 3/1991 | Reed . |
| 5,678,350 | 10/1997 | Moore . |

OTHER PUBLICATIONS

Bass Pro Shops Spring Sale Catalog (1993), p. 81.
Renosky Lures Catalog (1989–90), p. 5.
Tru–Turn Fishing Tackle Volume Discount Price List for 1995.

*Primary Examiner*—Kurt Rowan (57) ABSTRACT

The pliable bait minnow (1) having a head (4), body (6), and a tail (3). Twin lower fins (2) attached to the belly of the pliable bait minnow (1) and an upper dorcel fin (11) attached along the upper back. The body (6) is translucent with light reflective particles (5) dispersed throughout the pliable bait minnow (1). The fish is life-like in that it incorporates a two tone effect. The lower portion of the body (6) having a lighter coloration (7). The middle portion of the body (6) having a textured surface area resembling scales (8). The mouth (9) includes a wire coil (41) which attaches the pliable bait minnow (1) to the hook (10).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *